United States Patent [19]

Warner

[11] Patent Number: 4,645,420
[45] Date of Patent: Feb. 24, 1987

[54] PROPELLER CONTROL SYSTEM

[75] Inventor: Timothy R. Warner, Stratford, Conn.

[73] Assignee: Avco Corporation, Stratford, Conn.

[21] Appl. No.: 742,315

[22] Filed: Jun. 7, 1985

[51] Int. Cl.$^4$ ............................................. B64C 11/40
[52] U.S. Cl. ........................................ 416/48; 416/50
[58] Field of Search ................. 416/48, 45, 50, 44, 416/47, 157 R

[56] References Cited

U.S. PATENT DOCUMENTS

| | | | |
|---|---|---|---|
| 3,115,938 | 12/1963 | Fischer et al. | 416/50 X |
| 3,115,939 | 12/1963 | Berninger et al. | 416/45 |
| 3,387,663 | 6/1968 | Barnes et al. | 416/50 X |
| 3,389,641 | 6/1968 | Barnes | 416/49 X |
| 3,575,529 | 4/1971 | Bierman | 416/46 X |
| 4,588,354 | 5/1986 | Duchesneall et al. | 416/48 X |

Primary Examiner—Everette A. Powell, Jr.
Attorney, Agent, or Firm—Ralph D. Gelling

[57] ABSTRACT

A propeller control system, including a propeller governor, overspeed governor, and a bleed valve, is provided to control the flow of fluid under pressure from a pump to an hydraulically controlled, variable pitch propeller driven by a gas turbine engine. Under normal operating condition, the propeller governor controls the pressure of the fluid supplied to the propeller, adjusting its pitch as needed to maintain constant speed operation. The overspeed governor prevents overspeeding of the propeller and engine in the event that the propeller governor becomes inoperative, and, in the event that both governors become inoperative, the bleed valve prevents sudden increases in fluid pressure, attendant with the failure, from adjusting the pitch of the propeller towards an overspeed position.

2 Claims, 2 Drawing Figures

PROPELLER CONTROL SYSTEM

BACKGROUND OF THE INVENTION

The pitch of an hydraulic, variable speed propeller, driven by a gas turbine engine, is typically controlled by a governor directly driven by the output shaft of a gearbox associated with the engine. In normal operation, the governor is responsive to the speed of the output shaft and modulates the pressure and volume of a fluid, such as oil, to vary the pitch of the propeller's blades and maintain a constant speed commensurate with the setting of the governor. However, in the event that the mechanism for driving the governor should fail, the governor would sense a drop in speed and reduce the pitch of the propeller's blades and hence its ability to absorb power from the engine. Since a gas turbine engine can accelerate very rapidly, there would be a substantial danger that the engine would overspeed to destruction before the operator of the engine could take corrective action.

One way to prevent overspeeding is to provide a second governor to sense the overspeed condition and assume control. The second governor would then increase the pitch of the propeller's blades by venting oil from the propeller control mechanism thereby limiting the maximum speed of the engine. However, if both the propeller governor and the overspeed governor are driven by the same drive mechanism, a failure of that mechanism would render both governors inoperative. To cope with such an occurrence, the present invention provides means for immediately reducing the pressure and volume of the the fluid being supplied to the propeller control mechanism thereby increasing the pitch of its blades and preventing the engine from destructive overspeeding.

SUMMARY OF INVENTION

The preferred embodiment of the present invention is described in association with a gas turbine engine driving an hydraulic, variable speed propeller in a typical turbo-prop installation. It comprises a propeller governor and an overspeed governor, both connected by a common drive mechanism to the output shaft of a gearbox associated with the engine. The propeller governor can be adjusted by the engine's operator to maintain the speed of the engine by automatically varying the pitch of the propeller's blades.

The propeller governor includes an integral booster pump supplied with oil under pressure by a pump driven by the engine. The booster pump increases the pressure of the oil which then flows past a spool valve in the propeller governor to the propeller control mechanism. The position of the spool valve, controlled by a centrifugal device within the governor, determines the pressure and volume of the oil supplied to the propeller control mechanism and thus the pitch of the propeller's blades.

The overspeed governor also incorporates a centrifugal device for controlling the position of a second spool valve in fluid communication with the propeller control mechanism. In the event that an overspeed condition exists, the centrifugal device shifts its associated spool valve to relieve oil from the propeller control mechanism, thereby increasing the pitch of the propeller's blades and slowing the engine.

The present invention also provides means for preventing dangerous overspeeding that might occur if the mechanism driving both governors failed. It comprises a bleed valve which reduces the volume of oil being supplied to the propeller control mechanism by the booster pump during the time that it coasts to rest. The provision of the bleed valve is of vital importance since the booster pump and the other elements of the propeller governor has substantial inertia which tends to prolong the operation of the booster pump. Although its output pressure gradually drops, the spool valve in the propeller governor rapidly opens, producing a sudden increase of oil flow that is relieved by the bleed valve. Doing so permits the propeller control mechanism to shift the associated propeller blades towards a feathered position.

DESCRIPTION OF THE DRAWING

The invention is described in more detail below with particular reference to the attached drawings in which.

DESCRIPTION OF THE INVENTION

Figure 1:
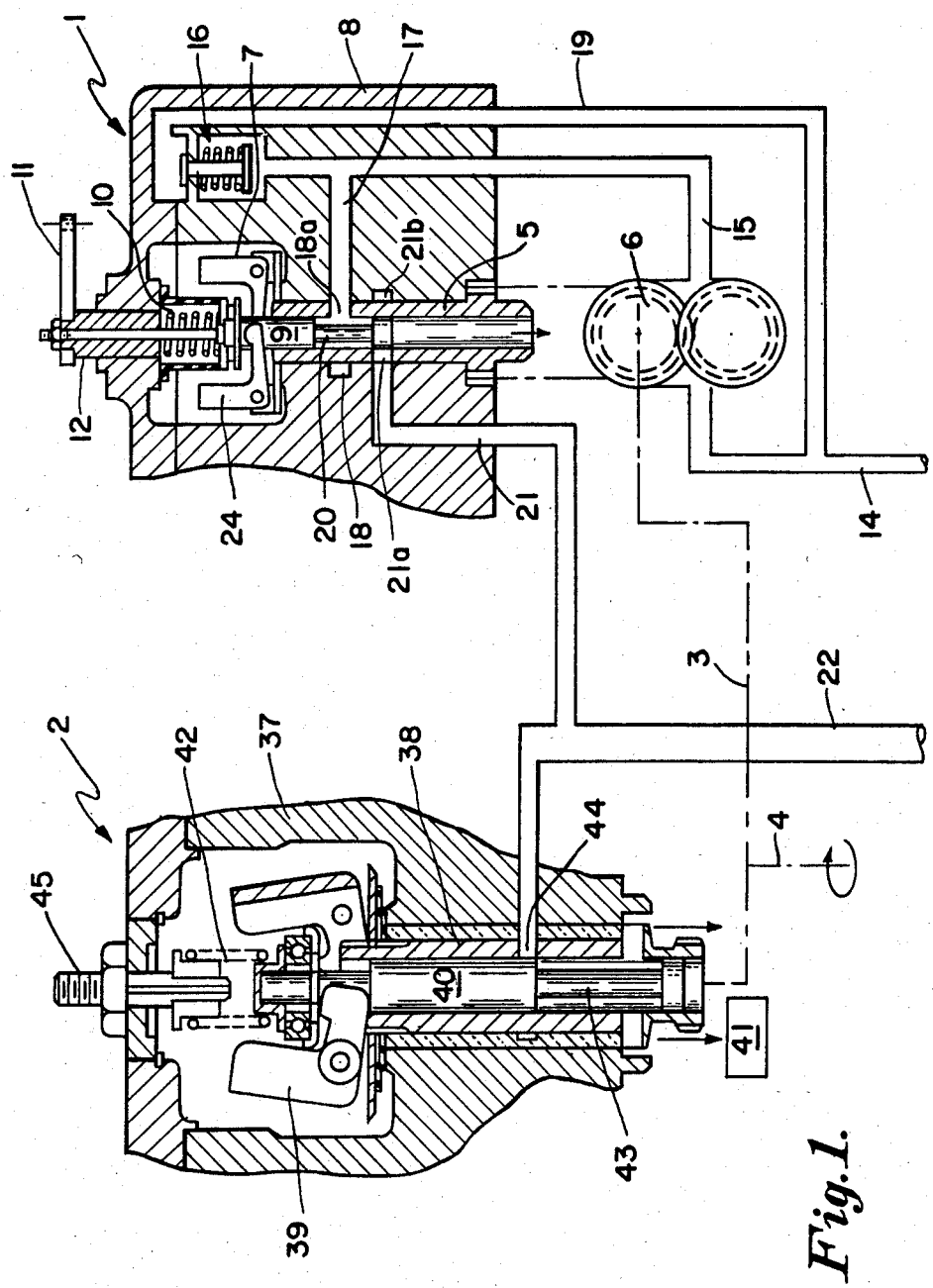
FIG. 1 is a cross-sectional view of the propeller and overspeed governors.
Figure 2:
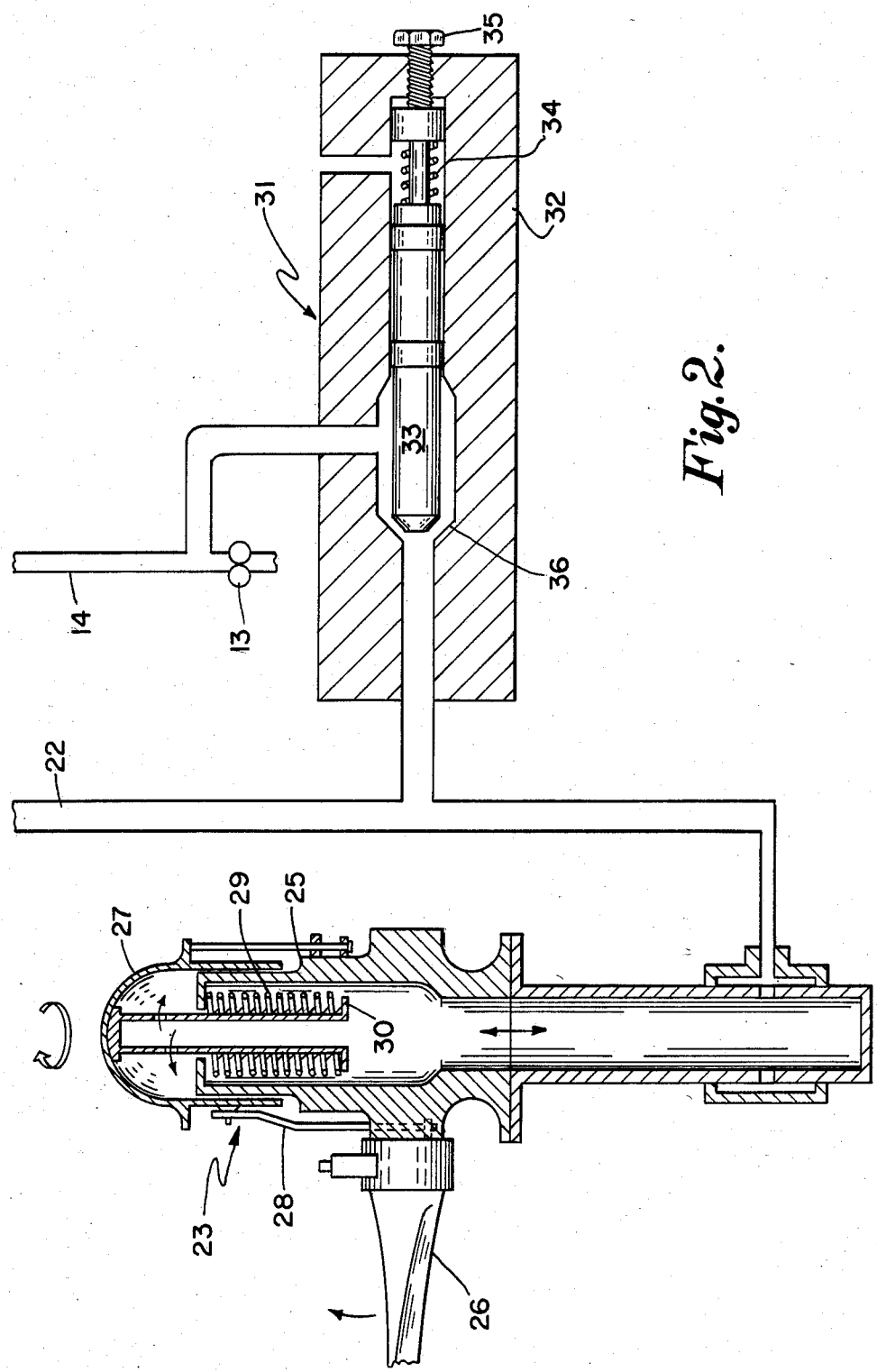
FIG. 2 is a cross-sectional view of the propeller control mechanism and bleed valve.

Referring to the attached drawing, the invention comprises a propeller governor, generally designated 1, and an overspeed governor, generally designated 2, both driven by a common drive mechanism, schematically indicated by a broken dash line 3. Drive mechanism 3 is directly connected, as indicated by broken dash line 4, to the output shaft of the gas turbine engine's gearbox (not shown)

Directing attention to the propeller governor 1, it comprises a sleeve 5, a booster pump 6, and a flyweight mechanism 7 rotatably supported by housing 8. The sleeve 5, booster pump 6, and flyweight mechanism 7 are driven by the drive mechanism 3. Sleeve 5 slidably supports a spool valve 9, the axial movement of which is determined by the flyweight mechanism 7 and a compression coil spring 10 as will be explained below. The force of the coil spring is determined by the position of an adjustment lever 11 connected to a threaded stub shaft 12 rotatably engaged with housing 8. As the stub shaft is rotated by the adjusting lever, it moves into or out of housing 8, thereby varying the compression of coil spring 10. The position of the adjusting lever is controlled by the operator of the gas turbine engine and, as will be explained below, determines the operating speed of the engine at any given throttle setting.

Fluid, typically oil under pressure, is supplied by an engine-driven oil pump 13 to the inlet of the booster pump via conduit 14 From the outlet of the booster pump oil flows through conduit 15 to a spring-loaded check valve, generally designated 16, and, via a communicating channel 17, to an annulus 18 defined by housing 8. The output pressure of the booster pump is limited to a predetermined maximum level by the operation of the check valve which, when it opens, by-passes oil to conduit 19 and thence to conduit 14.

Spool valve 9 has an intermediate section 20 of reduced diameter communicating with annulus 18 via a port 18a in the side wall of the sleeve 5. As the spool valve moves downward from the position shown in the drawing, oil under pressure is admitted to channel 21, via port 21a and annulus 21b, and thence to an associated conduit 22 connected to a propeller control mechanism, generally designated 23. The axial position of the spool valve is determined by the position of pivoted arms 24 of flyweight mechanism 7 in response to the centrifugal forces generated by their rotation. In moving the spool valve, the force of the pivotal arms 24 is balanced by the force of coil spring 10 in a manner well-known in the art.

The propeller control mechanism includes hub 25 operatively connected to the propeller's blades, one of which is shown at 26. The blade may be rotated about its longitudinal axis by axial movement of an hydraulic piston 27 on hub 25, the movement of the piston being transferred to the blade through linkage 28. The piston may be moved outward from the hub by oil under pressure supplied to the interior of the hub through conduit 22. Such movement rotates the propeller blade towards a fine pitch position. However, if the oil pressure is reduced, the piston will move towards the hub under the influence of spring 29 acting upon extension 30 of the piston 27. Such movement rotates the propeller blade towards a feathered position.

A bleed valve, generally designated 31, is provided to by-pass oil from conduit 22 to the inlet of the booster pump 6 for reasons to be explained below. The bleed valve comprises a housing 32 slidably supporting a cylindrical core 33 biased towards a closed position within the housing by the force of spring 34. The force of the spring may be adjusted by adjusting screw 35 threadedly engaged with the housing 32. When the oil pressure within conduit 22, acting on the end of the core, is sufficient to overcome the force of spring 34, the core is forced off of its seat 36, permitting oil to flow through the valve to conduit 14.

Directing attention now to overspeed governor 2, it will be noted that it comprises a housing 37 rotatably supporting a sleeve 38 and a flyweight mechanism 39, both of which are driven by drive mechanism 3. The flyweight mechanism 39 is connected to a spool valve 40, slidably supported by sleeve 38, and positions the spool valve to by-pass oil from conduit 22 to sump 41 of the engine's gearbox when the engine overspeeds. Under such conditions, the centrifugal force of the flyweight mechanism overcomes the force of compression coil spring 42, moving the spool valve 40 upward, as viewed in the drawing, until its intermediate section 43 of reduced diameter uncovers port 44 in sleeve 38 in a manner comparable to that explained with reference to the propeller governor. The force of the compression spring 42, set by adjusting screw 45, prohibits passage of oil past the spool valve until the speed of the flyweight mechanism exceeds a value sufficient to compress the spring 42. When that speed is exceeded, the overspeed governor relieves pressure momentarily from conduit 22, permitting spring 29 to move piston 27 so as to increase the angle of propeller blade 26.

DESCRIPTION OF OPERATION

Before the gas turbine engine is started, both the propeller governor and the overspeed governor are stationary. Bleed valve 31 is closed and, since both the engine oil pump 13 and booster pump 6 are at rest, no pressure exists in the system. Spring 29 of the propeller control mechanism 23 has forced piston 27 towards hub 25 thereby placing propeller blade 26 in a feathered position.

As the engine is started, oil pump 13 and booster pump 6 become operational, as do both governors. The pressure of the oil in conduits 14 and 15 rapidly increases, and oil flows past intermediate section 20 of spool valve 9 to conduit 22 and thence to the propeller control mechanism. The oil pressure, acting on piston 27, gradually moves propeller blade 26 towards a fine pitch position, permitting the engine, and hence governors 1 and 2, to increase in speed. At any given setting of the engine throttle and propeller adjusting lever 11, the entire system stabilizes with spool valve 9 in the position shown in the drawing. In that position, the spool valve, responsive to the action of its associated flyweight mechanism, intermittently feeds oil, supplied by the booster pump 6, to conduit 22 and thence the propeller control mechanism in an amount sufficient to vary the pitch of the propeller as needed to maintain substantially constant engine speed. During such stable operating conditions, bleed valve 31 is open, thereby by-passing oil from conduit 22 to the inlet of the booster pump. The capacity of the booster pump is sufficient to maintain the desired pressure in conduit 22 despite the diversion of oil through the bleed valve.

In the event that the propeller governor failed, possibly permitting the full output of the booster pump to be supplied to the propeller control mechanism, the propeller blades would be shifted towards a fine pitch position. That would, in effect, rapidly unload the engine and permits its speed to accelerate. The rate of acceleration of a gas turbine engine is so great that destructive overspeeding might well occur before the engine's operator could take corrective action. The overspeed governor precludes such an occurrence, its flyweight mechanism compressing spring 42 and raising spool valve 40 above the position shown in the drawing. Intermediate section 43 of the spool valve would then vent oil from conduit 22 to sump 41, dropping the pressure and reducing the volume of the oil in the propeller control mechanism and permitting spring 29 to force the propeller's blades towards a feathered position. Such movement of the blades would rapidly load the engine and prevent overspeeding.

However, should drive mechanism 3 fail, the overspeed governor, as well as the propeller governor, would be rendered inoperative. In that event, both governors would coast to a condition of rest. Because of its inertia, the booster pump would continue to pump oil as it slowed down but the flyweight mechanism 7 would immediately move spool valve 9 to interconnect the output of the booster pump to conduit 22. As a result, the pressure of the oil supplied to the propeller control mechanism would suddenly increase and force the propeller blades rapidly towards a fine pitch setting. Overspeeding would be imminent but for the presence of the bleed valve 31 which vents oil from conduit 22 to the inlet of the booster pump. Doing so quickly reduces the pressure and volume of oil in the propeller control mechanism which then acts to move the propeller blades towards a safe position. As that occurs, the engine is loaded and slowed down, giving the operator ample time to cut off the fuel flow to the engine.

From the foregoing, it will be understood that the novel combination of elements permits controlled operation of the engine under all normal conditions and assures its safety in the event that the propeller governor and the overspeed governor should become inoperative.

According to the above description, the following invention is claimed as novel and is desired to be secured by Letters Patent of the United States.

I claim:

1. A system for controlling the pitch of a variable pitch propeller driven by a gas turbine engine comprising:
   a propeller governor, including a booster pump, driven by the gas turbine engine, said booster pump having an inlet and an outlet;
   a spool valve in said propeller governor having and inlet and an outlet;
   a flyweight mechanism in said propeller governor for controlling the position of said spool valve as a function of engine speed;
   a source of fluid under pressure in fluid communication with the inlet of said booster pump;
   means for conveying fluid under pressure from the outlet of said booster pump to the inlet of said spool valve;
   a propeller control mechanism for adjusting the pitch of the propeller;
   means for conveying fluid, the pressure of which is modulated by movement of said spool valve in response to operation of said flyweight mechanism, from the outlet of said spool valve to said propeller control mechanism whereby propeller pitch is controlled; and
   an overspeed governor driven by the gas turbine engine, said overspeed governor being in fluid communication with the outlet of said spool valve of said propeller governor and said propeller control mechanism to relieve pressure of the fluid supplied to it in the event that said propeller governor fails and is unable to control the pitch of the propeller.

2. A system for controlling the pitch of a variable pitch propeller as described in claim 1 further comprising:
   pressure responsive valve means in fluid communication with said propeller control mechanism and the inlet of said booster pump for by-passing fluid from said propeller control mechanism to the inlet of said booster pump during normal operation and for relieving pressure from said propeller control mechanism if both said propeller and overspeed governors fail.

* * * * *